United States Patent
Zheng et al.

(10) Patent No.: US 11,894,549 B2
(45) Date of Patent: Feb. 6, 2024

(54) THREE-DIMENSIONAL POROUS SILICON/CARBON COMPOSITE MATERIAL, METHOD FOR PREPARING SAME, AND USE THEREOF

(71) Applicant: Guangdong Kaijin New Energy Technology Co., Ltd., Dongguan (CN)

(72) Inventors: Anhua Zheng, Guangdong (CN); Dexin Yu, Guangdong (CN); Yongjun Yang, Guangdong (CN)

(73) Assignee: GUANGDONG KAIJIN NEW ENERGY TECHNOLOGY CO., LTD., Dongguan (CN)

( * ) Notice: Subject to any disclaimer, the term of this patent is extended or adjusted under 35 U.S.C. 154(b) by 257 days.

(21) Appl. No.: 17/483,828

(22) Filed: Sep. 24, 2021

(65) Prior Publication Data

US 2022/0310989 A1    Sep. 29, 2022

(30) Foreign Application Priority Data

Mar. 26, 2021  (CN) .......................... 202110324659.2

(51) Int. Cl.
| | |
|---|---|
| H01M 4/36 | (2006.01) |
| H01M 4/139 | (2010.01) |
| H01M 4/62 | (2006.01) |
| H01M 10/0525 | (2010.01) |
| H01M 4/02 | (2006.01) |

(52) U.S. Cl.
CPC ........... *H01M 4/366* (2013.01); *H01M 4/139* (2013.01); *H01M 4/625* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 2020/0152973 A1 | 5/2020 | Mason et al. | |
| 2022/0048774 A1 * | 2/2022 | Yan | ..................... H01M 4/1395 |

FOREIGN PATENT DOCUMENTS

| | | | | |
|---|---|---|---|---|
| CN | 109802120 A * | 5/2019 | | ........... C01B 32/194 |
| CN | 110556519 A | 12/2019 | | |
| CN | 110582823 A | 12/2019 | | |
| CN | 112133915 A | 12/2020 | | |
| WO | 2020151093 A1 | 7/2020 | | |
| WO | WO-2021048555 A1 * | 3/2021 | | ............. H01G 11/24 |

OTHER PUBLICATIONS

International Search Report of PCT Patent Application No. PCT/CN2021/099099 dated Dec. 30, 2021.
Written Opinion of the International Searching Authority of PCT Patent Application No. PCT/CN2021/099099 dated Dec. 30, 2021.

* cited by examiner

*Primary Examiner* — Carlos Barcena

(57) ABSTRACT

A three-dimensional porous silicon/carbon composite material includes a three-dimensional porous skeleton, a filler layer, and a coating layer. The three-dimensional porous skeleton is a three-dimensional porous carbon skeleton; the filler layer includes silicon particles and conductive carbon; the filler layer is formed by scattering the silicon particles evenly and dispersively in the conductive carbon; and the coating layer is a carbon coating layer. The present invention provides the three-dimensional porous silicon/carbon composite material with long cycle and low expansion, a method for preparing the same, and a use thereof.

8 Claims, 2 Drawing Sheets

THREE-DIMENSIONAL POROUS SILICON/CARBON COMPOSITE MATERIAL, METHOD FOR PREPARING SAME, AND USE THEREOF

FIELD

The present invention relates to the field of anode materials for lithium batteries, and in particular relates to a three-dimensional porous silicon/carbon composite material, a method for preparing the same, and a use thereof.

BACKGROUND

Secondary batteries have been widely applied to portable electronic products. With the miniaturization development of portable electronic products and the increasing demands for secondary batteries in the aviation, military, and automotive industries, there is an urgent need for greatly improving the capacity and energy density of batteries. At present, commercial anode materials are mainly graphite materials, which, however due to their low theoretic capacity (372 mAh/g), cannot meet the market needs. In recent years, the attention of people has focused on novel anode materials with a high specific capacity, such as lithium storage metals (such as Sn and Si) and the oxides thereof, as well as lithium transition metal phosphides. Due to its high theoretical specific capacity (4200 mAh/g), Si has become one of the most potential alternatives to graphite materials. However, Si-based materials show a great volume effect (appr. 300%) during a charge/discharge process, and are likely to undergo cracking and pulverization and lose contact with a current collector, leading to a sharp decrease of cycle performance.

Current silicon/carbon anode materials are composite materials prepared by granulating nano-silicon, graphite, and carbon. Since nano-silicon is difficult to scatter evenly, it will inevitably lead to the local aggregation of nano-silicon. The carbon content at a position with the aggregation of the nano-silicon is relatively low, so that the volume expansion during the cycle process of the nano-silicon cannot be absorbed favorably at that position, and excessive local expansion may be caused at the position with the aggregation of the nano-silicon, which leads to local structural damage which affects the overall performance of the material.

Therefore, how to increase the scattering evenness of the nano-silicon in the silicon/carbon composite material, reduce the volumetric expansion effect, and improve the cycle performance has great significance for the application of silicon-based materials in lithium-ion batteries.

SUMMARY

In order to solve the technical problems described above, the present invention provides a three-dimensional porous silicon/carbon composite material with a long cycle and low expansion, a method for preparing the same, and a use thereof.

The present invention employs the following technical solution:

A three-dimensional porous silicon/carbon composite material includes a three-dimensional porous skeleton, a filler layer, and a coating layer, wherein the three-dimensional porous skeleton is a three-dimensional porous carbon skeleton; the filler layer includes silicon particles and conductive carbon, the filler layer is formed by scattering the silicon particles evenly and dispersively in the conductive carbon; and the coating layer is a carbon coating layer.

As a further improvement of the technical solution described above, the three-dimensional porous silicon/carbon composite material has a particle size D50 of 2-40 μm; the three-dimensional porous silicon/carbon composite material has a specific surface area of 0.5-10 m$^2$/g; the three-dimensional porous silicon/carbon composite material has a porosity of 1-30%; and the three-dimensional porous silicon/carbon composite material has a pore size of 0-50 nm.

As a further improvement of the technical solution described above, the three-dimensional porous skeleton has a porosity of 10-90% and a pore size of 10-500 nm.

As a further improvement of the technical solution described above, the silicon particles include one or both of nano-silicon or nano-silicon oxide; the nano-silicon has a particle size D50 of 1-100 nm; the nano-silicon has a grain size of 1-40 nm; the nano-silicon is one or both of polycrystalline nano-silicon or amorphous nano-silicon; and X in the nano-silicon oxide $SiO_x$ is 0-0.8.

As a further improvement of the technical solution described above, at least one carbon coating layer is provided, with a monolayer thickness of 0.2-1.0 μm; and the carbon coating layer is one of pyrolyzed carbon coating or vapor-phase carbon coating or liquid-phase coating.

A method for preparing a three-dimensional porous silicon/carbon composite material comprises the following steps:

preparing a three-dimensional porous carbon skeleton M;

placing the three-dimensional porous carbon skeleton M in a reactor, and depositing silicon particles and conductive carbon in the three-dimensional porous carbon skeleton M by synchronous or alternate vapor deposition in a protective atmosphere at a rate of 0.5-20 L/min to obtain a precursor A of the silicon-carbon composite material, wherein the synchronous or alternate vapor deposition is performed at the temperature of 400-1000° C. for a duration of 0.5-20 h;

performing carbon coating on the precursor A of the silicon/carbon composite material to prepare a precursor B of the silicon/carbon composite material; and sintering the precursor B of the silicon/carbon composite material at high temperature to prepare the three-dimensional porous silicon/carbon composite material.

As a further improvement of the technical solution described above, in the step of preparing the three-dimensional porous carbon skeleton M, a method for preparing the three-dimensional porous carbon skeleton M includes: pyrolyzing an organic carbon source capable of forming a porous structure to prepare the three-dimensional porous carbon skeleton M, or performing pyrolysis and chemical activation treatment on the organic carbon source to prepare the three-dimensional porous carbon skeleton M, wherein the chemical activation treatment includes: activating a carbon material to form pores by using a pore-forming activator.

As a further improvement of the technical solution described above, the step of synchronous vapor deposition includes: mixing the organic carbon source and a silicon source at a ratio A with the protective atmosphere, and introducing a mixture into the reactor for vapor deposition, wherein the ratio A includes a flow ratio of 10:1-1:1 between the organic carbon source to the silicon source.

As a further improvement of the technical solution described above, the step of the alternate vapor deposition described above, includes: first, mixing the silicon source with the protective atmosphere at a ratio B and introducing a resultant mixture into the reactor for 5-600 seconds for vapor deposition of ultrafine nano-silicon, and then, mixing the organic carbon source with the protective atmosphere at a ratio C and introducing a resultant mixture into the reactor for 5-600 seconds for vapor deposition of the conductive carbon, wherein constant alternate introduction is accomplished by a solenoid valve; or, first, mixing the organic carbon source with the protective atmosphere at a ratio C and introducing a resultant mixture into the reactor for 5-600 seconds for vapor deposition of the conductive carbon, and then, mixing the silicon source with the protective atmosphere at a ratio B and introducing a resultant mixture into the reactor for 5-600 seconds for vapor deposition of the ultrafine nano-silicon, wherein constant alternate introduction is accomplished by a solenoid valve, the ratio B includes a flow ratio of 1:1-1:20 between the silicon particles to the protective atmosphere; and the ratio C includes a flow ratio of 1:1-1:20 between the organic carbon source and the protective atmosphere.

A use of a three-dimensional porous silicon/carbon composite material is provided, wherein the three-dimensional porous silicon/carbon composite material prepared by using the method for preparing the three-dimensional porous silicon/carbon composite material defined above is used in a lithium-ion battery.

The present invention has the following advantageous effects.

A conductive network formed by the three-dimensional porous skeleton of the present invention can effectively improve the conductivity of the silicon-based material, and the porous structure in the three-dimensional porous skeleton can effectively alleviate the volumetric expansion of the silicon particles during a charge/discharge process, which can effectively prevent the material from being pulverized during a cycle process; the conductive carbon in the filler layer not only can improve the conductivity of the material and alleviate the volume expansion of the nano-silicon material, but also can further prevent the silicon particles from directly contacting electrolytes during the cycle process, thereby reducing side reactions; and the outermost carbon coating layer can prevent the silicon particles from directly contacting the electrolytes to reduce the side reactions, and meanwhile, can further effectively increase the conductivity of the silicon-based material and alleviate the volumetric effect during the charge/discharge process.

DESCRIPTION OF THE EMBODIMENTS

Figure 1:
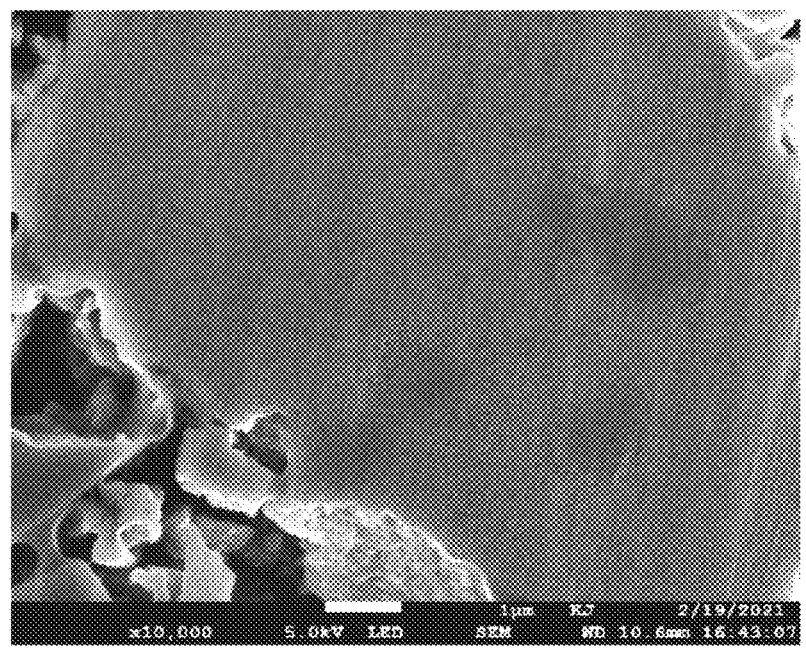
FIG. 1 shows a FIB-SEM diagram of a three-dimensional porous silicon/carbon composite material according to Embodiment 2 of the present invention.

The technical solutions in the embodiments of the present invention will be described clearly and completely below in conjunction with accompanying drawings of the present invention.

A three-dimensional porous silicon/carbon composite material includes a three-dimensional porous skeleton, a filler layer and a coating layer. In some embodiments, the three-dimensional porous skeleton is a three-dimensional porous carbon skeleton. The filler layer includes silicon particles and conductive carbon. The filler layer is formed by scattering the silicon particles evenly and dispersively in the conductive carbon. The coating layer is preferably a carbon coating layer. The silicon particles are formed from a silicon source through pyrolysis, and the conductive carbon is formed from an organic carbon source through pyrolysis.

The three-dimensional porous silicon/carbon composite material has a particle size D50 of 2-40 μm, further preferably 2-20 μm, and particularly preferably 2-10 μm.

The three-dimensional porous silicon/carbon composite material has a specific surface area of 0.5-10 m$^2$/g, further preferably 0.5-5 m$^2$/g, and particularly preferably 0.5-3 m$^2$/g.

The three-dimensional porous silicon/carbon composite material has a porosity of 1-30%, further preferably 1-20%, and particularly preferably 1-10%.

The three-dimensional porous silicon/carbon composite material has a pore size of 0-50 nm, further preferably 0-30 nm, and particularly preferably 0-20 nm.

The three-dimensional porous silicon/carbon composite material has an oxygen content of 0-20%, further preferably 0-10%, and particularly preferably 0-5%.

The three-dimensional porous silicon/carbon composite material has a carbon content of 20-90%, further preferably 20-60%, and particularly preferably 30-50%.

The three-dimensional porous silicon/carbon composite material has a silicon content of 5-90%, further preferably 20-70%, and particularly preferably 30-60%.

The three-dimensional porous skeleton has a porosity of 10-90%, further preferably 20-900%, and particularly preferably 40-90° %; and has a pore size of 10-500 nm.

The silicon particles include one or both of nano-silicon or nano-silicon oxide. The nano-silicon has a particle size D50 of 1-100 nm; the nano-silicon has a grain size of 1-40 nm; the nano-silicon comprises one or both of polycrystalline nano-silicon or amorphous nano-silicon, and X in the nano-silicon oxide $SiO_x$ is 0-0.8.

At least one carbon coating layer is provided, with a monolayer thickness of 0.2-1.0 μm; and the carbon coating layer is one of pyrolyzed carbon coating layer or vapor-phase carbon coating layer or liquid-phase coating layer.

A process of the vapor-phase carbon coating includes; placing an object to be coated in a reactor; introducing a protective gas into the reactor; increasing the temperature of the reactor to 400-1000° C. at a rate of 1-5° C./min; introducing an organic carbon source gas into the reactor at an introduction rate of 0.5-20.0 L/min; preserving heat for 0.5-20 h; and naturally cooling the reactor to room temperature to obtain a vapor-phase coating product.

A process of the liquid-phase carbon coating includes: mixing an organic carbon source, an object to be coated and a solvent at high speed to disperse the same evenly to form a slurry; spraying and drying the slurry; and thermally treating a resultant.

A method for preparing a three-dimensional porous silicon/carbon composite material comprises the following steps:

preparing a three-dimensional porous carbon skeleton M;

placing the three-dimensional porous carbon skeleton M in a reactor, and depositing silicon particles and conductive carbon in the three-dimensional porous carbon skeleton M by synchronous or alternate vapor deposition in a protective atmosphere at a rate of 0.5-20 L/min to obtain a precursor A of the silicon-carbon composite material, wherein the synchronous or alternate vapor deposition is performed at the temperature of 400-1000° C. for a duration of 0.5-20 h, the protective atmosphere includes one or more of nitrogen, argon, helium, hydrogen, and an argon-hydrogen mixed gas; and the reactor is one or more of a rotary furnace, a CVD furnace, a PECVD furnace, and a fluidized bed; and performing carbon coating on the precursor A of the silicon/carbon composite material to obtain a precursor B of the silicon/carbon composite material; and sintering the precursor B of the silicon/carbon composite material at high temperature to obtain the three-dimensional porous silicon/carbon composite material.

Preferably, in the step of preparing the three-dimensional porous carbon skeleton M, a method for preparing the three-dimensional porous carbon skeleton M includes: pyrolyzing an organic carbon source capable of forming a porous structure to prepare the three-dimensional porous carbon skeleton M, or performing pyrolysis and chemical activation treatment on the organic carbon source to prepare the three-dimensional porous carbon skeleton M, wherein the chemical activation treatment includes activating a carbon material to form pores by using a pore-forming activator. The organic carbon source for preparing the three-dimensional porous carbon skeleton M includes one or more of sucrose, glucose, citric acid, phenolic resin, epoxy resin, asphalt, polyvinyl alcohol, polypyrrole, polypyrrolidone, polyaniline, polyacrylonitrile, polydopamine, lignin, and chitin; and the pore-forming activator includes one or more of sodium hydroxide, potassium hydroxide, zinc chloride, and phosphoric acid.

The step of synchronous vapor deposition includes: mixing the organic carbon source and a silicon source at a ratio A with the protective atmosphere to form a mixture, and introducing the mixture into the reactor for vapor deposition, wherein the ratio A includes a flow ratio of 10:1-1:1 between the organic carbon source to the silicon source.

The step of the alternate vapor deposition includes: first, mixing the silicon source with the protective atmosphere at a ratio B and introducing a resultant mixture into the reactor for 5-600 seconds for vapor deposition of ultrafine nano-silicon, and then, mixing the organic carbon source with the protective atmosphere at a ratio C and introducing a resultant mixture into the reactor for 5-600 seconds for vapor deposition of the conductive carbon, wherein constant alternate introduction is accomplished by an solenoid valve. Alternatively, the step of the alternate vapor deposition includes: first, mixing the organic carbon source with the protective atmosphere at a ratio C and introducing a resultant mixture into the reactor for 5-600 seconds for vapor deposition of the conductive carbon, and then, mixing the silicon source with the protective atmosphere at a ratio B and introducing a resultant mixture into the reactor for 5-600 seconds for vapor deposition of the ultrafine nano-silicon, wherein constant alternate introduction is accomplished by an solenoid valve. The ratio B includes a flow ratio of 1:1-1:20 between the silicon particles to the protective atmosphere; and the ratio C includes a flow ratio of 1:1-1:20 between the organic carbon source and the protective atmosphere.

In the step of synchronous or alternate vapor deposition, the silicon source includes one or more of silane, trichlorosilane, silicon tetrachloride, methyltrichlorosilane, methylchlorosilane, chloroethylsilane, dichlorodimethylsilane, dichlorodiethylsilane, methylsilane, dimethylsilane, trimethylsilane, tetramethylsilane, methyldisilane, dimethyldisilane, trimethyldisilane, tetramethyldisilane, and hexamethylsilane.

In the step of synchronous or alternate vapor deposition, the organic carbon source includes one or more of methane, ethane, propane, isopropane, butane, isobutane, ethylene, propylene, acetylene, butene, vinyl chloride, vinyl fluoride, vinyl difluoride, chloroethane, fluoroethane, difluoroethane, chloromethane, fluoromethane, difluoromethane, trifluoromethane, methylamine, formaldehyde, benzene, toluene, xylene, styrene, and phenol.

A use of a three-dimensional porous silicon/carbon composite material is provided, where the three-dimensional porous silicon/carbon composite material prepared by using the method for preparing the three-dimensional porous silicon/carbon composite material defined above is used in a lithium-ion battery.

Embodiment 1

1. 1000 g of lignin and 200 g of KOH were evenly mixed and then sintered under the condition of a nitrogen protective atmosphere, wherein the temperature was increased at a rate of 1° C./min and the sintering temperature is 1150° C., and the heat was preserved for 5 h; and a resultant was cooled, then washed with water to remove impurities, and baked to prepare a three-dimensional porous carbon skeleton.

2. 1000 g of the prepared three-dimensional porous carbon skeleton was placed in a CVD furnace and heated to 1000° C. at a temperature rise rate of 5° C./min; high-purity nitrogen, a methane gas, and a silane gas were respectively introduced at rates of 4.0 L/min, 0.5 L/min, and 0.5 L/min, wherein a duration for introducing the mixed gas was 8 h; and a resultant was naturally cooled to room temperature to prepare a precursor 2.

3. 1000 g of the prepared silicon/carbon precursor 2 was placed in the CVD furnace and heated to 1000° C. at a temperature rise rate of 5° C./min; the high-purity nitrogen and the methane gas were respectively introduced at rates of 4.0 L/min and 0.5 L/min, and a duration for introducing the high-purity nitrogen and the methane gas was 4 h; and a resultant was naturally cooled to room temperature to prepare the silicon/carbon composite material.

Embodiment 2

1. 1000 g of lignin and 200 g of KOH were evenly mixed and then sintered under the condition of a nitrogen protective atmosphere; the temperature was increased at a rate of 1° C./min; the sintering temperature is 1150° C., and the heat was preserved for 5 h: and a resultant was cooled, then washed with water to remove impurities, and baked to prepare a three-dimensional porous carbon skeleton.

2. 1000 g of the prepared three-dimensional porous carbon skeleton was placed in a CVD furnace and heated to 1000° C. at a temperature rise rate of 5° C./min; high-purity nitrogen, a methane gas, and a silane gas were respectively introduced at rates of 4.0 L/min, 1.0 L/min, and 0.2 L/min, where a duration for introducing a mixed gas was 8 h; and a resultant was naturally cooled to room temperature to prepare a precursor 3.

3. 1000 g of the prepared silicon/carbon precursor 3 was placed in the CVD furnace and heated to 1000° C. at a temperature rise rate of 5° C./min; the high-purity nitrogen and the methane gas were respectively introduced at rates of 4.0 L/min and 0.5 L/min, and a duration for introducing the high-purity nitrogen and the methane gas was 4 h; and a resultant was naturally cooled to room temperature to prepare the silicon/carbon composite material.

Embodiment 3

1. 1000 g of lignin and 200 g of KOH were evenly mixed and then sintered under the condition of a nitrogen protective atmosphere; the temperature was increased at a rate of 1° C./min; the sintering temperature is 1150° C., and the heat was preserved for 5 h; and a resultant was cooled, then washed with water to remove impurities, and baked to prepare a three-dimensional porous carbon skeleton.

2. 1000 g of the prepared three-dimensional porous carbon skeleton was placed in a CVD furnace and heated to 1000° C. at a temperature rise rate of 5° C./min; high-purity nitrogen, a methane gas, and a silane gas were respectively introduced at rates of 4.0 L/min, 2.0 L/min, and 0.2 L/min, where a duration for introducing a mixed gas was 8 h; and a resultant was naturally cooled to room temperature to prepare a precursor 3.

3. 1000 g of the prepared silicon/carbon precursor 3 was placed in the CVD furnace and heated to 1000° C. at a temperature rise rate of 5° C./min; the high-purity nitrogen and the methane gas were respectively introduced at rates of 4.0 L/min and 0.5 L/min, and a duration for introducing the high-purity nitrogen and the methane gas was 4 h; and a resultant was naturally cooled to room temperature to prepare the silicon/carbon composite material.

Embodiment 4

1. 1000 g of lignin and 200 g of KOH were evenly mixed and then sintered under the condition of a nitrogen protective atmosphere; the temperature was increased at a rate of 1° C./min; the sintering temperature is 1150° C., and the heat was preserved for 5 h; and a resultant was cooled, then washed with water to remove impurities, and baked to prepare a three-dimensional porous carbon skeleton.

2. 1000 g of the prepared three-dimensional porous carbon skeleton was placed in a CVD furnace and heated to 1000° C. at a temperature rise rate of 5° C./min; high-purity nitrogen, a methane gas, and a silane gas were respectively introduced at rates of 4.0 L/min, 3.0 L/min, and 0.5 L/min, where a duration for introducing a mixed gas was 8 h; and a resultant was naturally cooled to room temperature to prepare a precursor 3.

3. 1000 g of the prepared silicon/carbon precursor 3 was placed in the CVD furnace and heated to 1000° C. at a temperature rise rate of 5° C./min; the high-purity nitrogen and the methane gas were respectively introduced at rates of 4.0 L/min and 0.5 L/min, and a duration for introducing the high-purity nitrogen and the methane gas was 4 h; and a resultant was naturally cooled to room temperature to prepare the silicon/carbon composite material.

Embodiment 5

1. 1000 g of lignin and 200 g of KOH were evenly mixed and then sintered under the condition of a nitrogen protective atmosphere; the temperature was increased at a rate of 1° C./min; the sintering temperature of 1150° C., and the heat was preserved for 5 h; and a resultant was cooled, then washed with water to remove impurities, and baked to prepare a three-dimensional porous carbon skeleton.

2. 1000 g of the prepared three-dimensional porous carbon skeleton was placed in a CVD furnace and heated to 1000° C. at a temperature rise rate of 5° C./min; high-purity nitrogen, a methane gas, and a silane gas were respectively introduced at rates of 4.0 L/min, 4.0 L/min, and 0.2 L/min, where a duration for introducing a mixed gas was 8 h; and a resultant was naturally cooled to room temperature to prepare a precursor 3.

3. 1000 g of the prepared silicon/carbon precursor 3 was placed in the CVD furnace and heated to 1000° C. at a temperature rise rate of 5° C./min; the high-purity nitrogen and the methane gas were respectively introduced at rates of 4.0 L/min and 0.5 L/min, and a duration for introducing the high-purity nitrogen and the methane gas was 4 h and a resultant was naturally cooled to room temperature to prepare the silicon/carbon composite material.

Comparative Example

1. Micro silicon with a particle size D50 of 3-10 μm and anhydrous ethanol were mixed evenly at a mass ratio of 1:10, and were ball-milled to prepare a nano-silicon slurry with a particle size D50=100 nm;

2. 1000 g of lignin and 200 g of KOH were evenly mixed and then sintered under the condition of a nitrogen protective atmosphere, where a temperature rise rate was 1° C./min, the sintering temperature was 1150° C., and heat was preserved for 5 h; and a resultant was cooled, then washed with water to remove impurities, and baked to prepare a three-dimensional porous carbon skeleton.

3. The nano-silicon slurry and the three-dimensional porous carbon skeleton were mixed evenly at a mass ratio of 10:1, and then sprayed and granulated to prepare a silicon/carbon precursor 1;

4. 1000 g of the prepared silicon/carbon precursor 1 was placed in the CND furnace and heated to 1000° C. at a temperature rise rate of 5° C./min; the high-purity nitrogen and the methane gas were respectively introduced at rates of 4.0 L/min and 0.5 L/min, and a duration for introducing the high-purity nitrogen and the methane gas was 4 h; and a resultant was naturally cooled to room temperature to prepare the silicon/carbon composite material.

The embodiments and comparative example described above will be tested as below.

Test conditions: the materials prepared in the comparative example and the embodiments were taken as anode materials and mixed with a binder polyvinylidene fluoride (PVDF), a conductive agent (Super-P) at a mass ratio of 70:15:15; a proper amount of N-methylpyrrolidone (NMP) was added as a solvent to prepare a slurry, which was coated on a copper foil; the coated copper foil was vacuum dried and rolled to prepare an anode piece. A metal lithium piece was used as a counter electrode, electrolyte prepared by using 1 mol/L LiPF6 three-component mixed solvent at a mixing ratio of EC:DMC:EMC=1:1:1 (v/v) was used, and a polypropylene microporous membrane was used as a separator, and a CR2032 type button battery was assembled in a glove box filled with an inert gas. A charge/discharge test of the button battery was performed on a battery test system in Landian Electronics (Wuhan) Co., Ltd. The charge/discharge occurred with 0.1 C at constant temperature, and a charge/discharge voltage was limited to 0.005-1.5 V.

A method for testing and calculating a volumetric expansion rate of the material was as follows: a composite material with a capacity of 500 mAh/g was prepared by compounding the prepared silicon/carbon composite material and graphite, and then tested in terms of cycle performance, where the expansion rate=(pole piece thickness after 50 cycles−pole piece thickness before cycle)/(pole piece thickness before cycle−copper foil thickness)*100%.

Table 1 shows the results of initial-cycle tests of the comparative example and the embodiments.

TABLE 1

|  | Initial charge specific capacity (mAh/g) | Initial discharge specific capacity (mAh/g) | Initial coulombic efficiency (%) |
|---|---|---|---|
| Comparative Example | 2377.2 | 1930.3 | 81.2 |
| Embodiment 1 | 2234.5 | 1950.6 | 87.3 |
| Embodiment 2 | 2143.9 | 1888.6 | 88.1 |
| Embodiment 3 | 1795.0 | 1608.3 | 89.6 |
| Embodiment 4 | 1835.0 | 1632.5 | 88.9 |
| Embodiment 5 | 1965.0 | 1713.6 | 87.2 |

Table 2 shows the results of cyclic expansion tests.

TABLE 2

|  | Initial discharge specific capacity (mAh/g) | 50-cycle expansion rate (%) | 50-cycle capacity retention rate (%) |
|---|---|---|---|
| Comparative Example | 500.1 | 55.0 | 74.2 |
| Embodiment 1 | 500.5 | 42.5 | 91.2 |
| Embodiment 2 | 500.4 | 40.2 | 92.3 |
| Embodiment 3 | 500.6 | 44.7 | 90.4 |
| Embodiment 4 | 501.0 | 43.4 | 93.4 |
| Embodiment 5 | 500.3 | 44.8 | 91.7 |

FIG. 1 shows the FIB-SEM of a sample from Embodiment 2. From FIG. 1, it can be seen that tiny nano-pores existing inside the material may alleviate the volumetric expansion during a charge/discharge process, and a conductive network may improve the conductivity of the material and improve the cycle and rate performances of the material.

Figure 2:
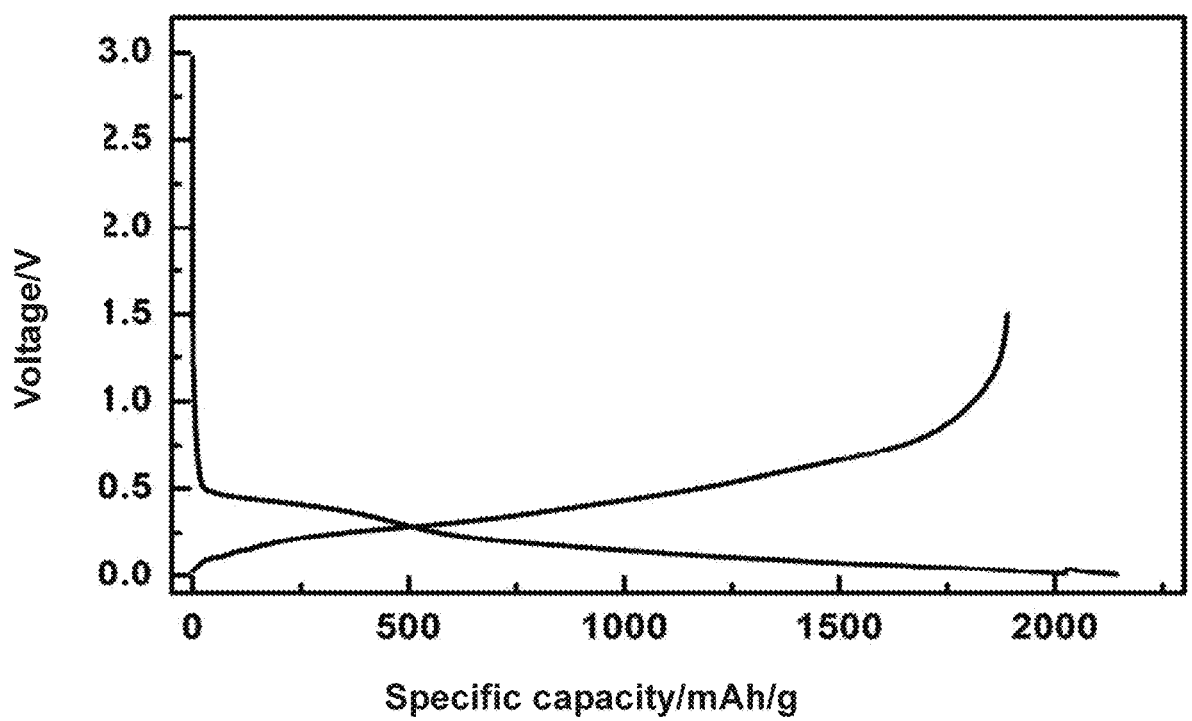
FIG. 2 shows an initial charge/discharge curve graph of the three-dimensional porous silicon/carbon composite material according to Embodiment 2 of the present invention.

FIG. 2 shows an initial charge/discharge curve of the sample from Embodiment 2. From FIG. 2, it can be seen that the sample has a capacity of 1888.6 mAh/g and the efficiency of 88.1%. From Tables 1 and 2, it can be seen that the composite material synthesized according to the present invention has an initial reversible capacity not less than 1600 mAh/g, and after 50 cycles, has an expansion rate less than 45% and a capacity retention rate more than 90%.

Figure 3:
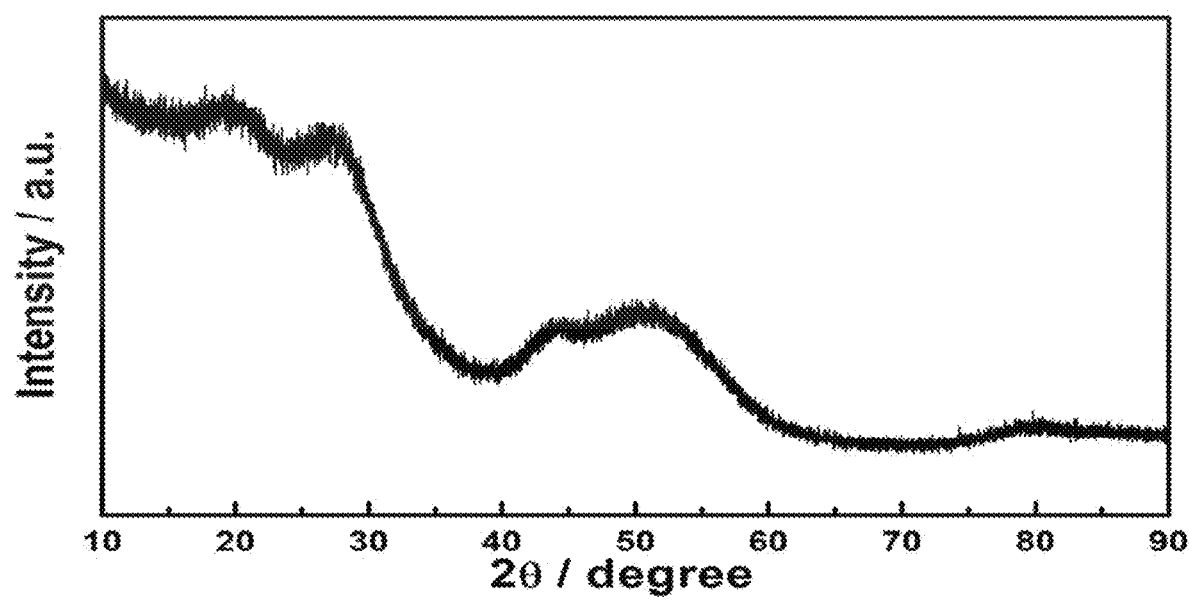
FIG. 3 shows an XRD pattern of a three-dimensional porous silicon/carbon composite material according to Embodiment 3 of the present invention.

FIG. 3 shows an XRD pattern of a sample from Embodiment 3. The silicon in the sample is in an amorphous state and is dispersively distributed in the conductive network and the conductive carbon.

The conductive network formed by the three-dimensional porous skeleton of the present invention can effectively improve the conductivity of the silicon-based material, and the porous structure in the three-dimensional porous skeleton can effectively alleviate the volumetric expansion of the silicon particles during the charge/discharge process, which can effectively prevent the material from being pulverized during a cycle process; the conductive carbon in the filler layer not only can improve the conductivity of the material and alleviate the volume expansion of the nano-silicon material, but also can further prevent the silicon particles from directly contacting electrolytes during the cycle process, thereby reducing side reactions; and the outermost carbon coating layer can prevent the silicon particles from directly contacting the electrolyte to reduce the side reactions, and meanwhile, can further effectively increase the conductivity of the silicon-based material and alleviate the volumetric effect during the charge/discharge process.

The embodiments above only provide specific and detailed descriptions of several implementations of the present invention, and therefore should not be construed to limit the patent scope of the present invention. It should be noted that several variations and improvements can be made by those of ordinary skills in the art without departing from the concept of the present invention, and shall be construed as falling within the protection scope of the present invention. Therefore, the patent protection scope of the present invention shall be subjected to the accompanying claims.

What is claimed is:

1. A three-dimensional porous silicon/carbon composite material, comprising a three-dimensional porous skeleton, a filler layer, and a coating layer, wherein the three-dimensional porous skeleton is a three-dimensional porous carbon skeleton, the filler layer comprises silicon particles and conductive carbon, the filler layer is formed by scattering the silicon particles evenly and dispersively in the conductive carbon, and the coating layer is a carbon coating layer;
wherein the three-dimensional porous silicon/carbon composite material is prepared by:
preparing the three-dimensional porous carbon skeleton;
placing the three-dimensional porous carbon skeleton in a reactor, and depositing silicon particles and conductive carbon in the three-dimensional porous carbon skeleton by alternate vapor deposition in a protective atmosphere at a rate of 0.5-20 L/min to obtain a precursor A of the silicon-carbon composite material, wherein the alternate vapor deposition is performed at a temperature of 400-1000° C. for a duration of 0.5-20 h;
performing carbon coating on the precursor A of the silicon/carbon composite material to prepare a precursor B of the silicon/carbon composite material; and
sintering the precursor B of the silicon/carbon composite material to prepare the three-dimensional porous silicon/carbon composite material;
wherein the alternate vapor deposition comprises:
mixing a silicon source with the protective atmosphere at a ratio B and introducing a resultant mixture into a reactor for 5-600 seconds for vapor deposition of nano-silicon; and
mixing an organic carbon source with the protective atmosphere at a ratio C and introducing another resultant mixture into the reactor for 5-600 seconds for vapor deposition of the conductive carbon;
wherein constant alternate introduction is accomplished by a solenoid valve, the ratio B comprises a flow ratio of 1:1-1:20 between the silicon particles to the protective atmosphere, and the ratio C comprises a flow ratio of 1:1-1:20 between the organic carbon source and the protective atmosphere.

2. The three-dimensional porous silicon/carbon composite material according to claim 1, wherein the three-dimensional porous silicon/carbon composite material has a particle size D50 of 2-40 μm, the three-dimensional porous silicon/carbon composite material has a specific surface area of 0.5-10 m$^2$/g, the three-dimensional porous silicon/carbon composite material has a porosity of 1-30%, and the three-dimensional porous silicon/carbon composite material has a pore size of 0-50 nm.

3. The three-dimensional porous silicon/carbon composite material according to claim 1, wherein the three-dimensional porous skeleton has a porosity of 10-90% and a pore size of 10-500 nm.

4. The three-dimensional porous silicon/carbon composite material according to claim 1, wherein the silicon particles comprise one or both of nano-silicon and nano-silicon oxide, the nano-silicon has a particle size D50 of 1-100 nm, the nano-silicon has a grain size of 1-40 nm, the nano-silicon comprises one or both of polycrystalline nano-silicon and amorphous nano-silicon, and X in the nano-silicon oxide $SiO_x$ is 0-0.8.

5. The three-dimensional porous silicon/carbon composite material according to claim 1, wherein at least one carbon coating layer is provided, with a monolayer thickness of 0.2-1.0 μm, and the carbon coating layer is one of pyrolyzed carbon coating or vapor-phase carbon coating or liquid-phase coating.

6. A method for preparing a three-dimensional porous silicon/carbon composite material, comprising:
    preparing a three-dimensional porous carbon skeleton M;
    placing the three-dimensional porous carbon skeleton M in a reactor, and depositing silicon particles and conductive carbon in the three-dimensional porous carbon skeleton M by alternate vapor deposition in a protective atmosphere at a rate of 0.5-20 L/min to obtain a precursor A of the silicon-carbon composite material, wherein the alternate vapor deposition is performed at a temperature of 400-1000° C. for a duration of 0.5-20 h;
    performing carbon coating on the precursor A of the silicon/carbon composite material to prepare a precursor B of the silicon/carbon composite material; and
    sintering the precursor B of the silicon/carbon composite material to prepare the three-dimensional porous silicon/carbon composite material;
    wherein the alternate vapor deposition comprises:
    mixing a silicon source with the protective atmosphere at a ratio B and introducing a resultant mixture into a reactor for 5-600 seconds for vapor deposition of nano-silicon; and
    mixing an organic carbon source with the protective atmosphere at a ratio C and introducing another resultant mixture into the reactor for 5-600 seconds for vapor deposition of the conductive carbon;
    wherein constant alternate introduction is accomplished by a solenoid valve, the ratio B comprises a flow ratio of 1:1-1:20 between the silicon particles to the protective atmosphere, and the ratio C comprises a flow ratio of 1:1-1:20 between the organic carbon source and the protective atmosphere.

7. The method for preparing the three-dimensional porous silicon/carbon composite material according to claim 6, wherein preparing the three-dimensional porous carbon skeleton M comprises:
    pyrolyzing an organic carbon source capable of forming a porous structure to prepare the three-dimensional porous carbon skeleton M; or
    performing pyrolysis and chemical activation treatment on the organic source to prepare the three-dimensional porous carbon skeleton M, wherein the chemical activation treatment comprises: activating a carbon material to form pores by using a pore-forming activator.

8. A use of a three-dimensional porous silicon/carbon composite material, wherein the three-dimensional porous silicon/carbon composite material prepared by using the method for preparing the three-dimensional porous silicon/carbon composite material according to claim 6 is used in a lithium-ion battery.

* * * * *